United States Patent
Liu et al.

(10) Patent No.: US 10,182,417 B2
(45) Date of Patent: Jan. 15, 2019

(54) METHOD FOR CAMPING ON SECTORS AND TERMINAL DEVICE

(71) Applicant: Telefonaktiebolaget L M Ericsson (publ), Stockholm (SE)

(72) Inventors: Jinhua Liu, Beijing (CN); Gen Li, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 234 days.

(21) Appl. No.: 14/771,794

(22) PCT Filed: Aug. 19, 2015

(86) PCT No.: PCT/CN2015/087553
§ 371 (c)(1),
(2) Date: Aug. 31, 2015

(87) PCT Pub. No.: WO2017/028280
PCT Pub. Date: Feb. 23, 2017

(65) Prior Publication Data
US 2017/0273052 A1    Sep. 21, 2017

(51) Int. Cl.
*H04W 68/02* (2009.01)
*H04W 60/00* (2009.01)
*H04W 48/16* (2009.01)
*H04W 16/28* (2009.01)

(52) U.S. Cl.
CPC ........... *H04W 68/02* (2013.01); *H04W 48/16* (2013.01); *H04W 60/005* (2013.01); *H04W 16/28* (2013.01)

(58) Field of Classification Search
CPC .... H04W 68/02; H04W 48/16; H04W 60/005
See application file for complete search history.

(56) References Cited

U.S. PATENT DOCUMENTS

| 6,072,986 A | 6/2000 | Blanchard et al. | |
| 6,505,042 B1* | 1/2003 | Hafiz | H04W 68/00 455/434 |
| 8,010,117 B1* | 8/2011 | Sigg | H04W 16/06 370/331 |

(Continued)

FOREIGN PATENT DOCUMENTS

| CN | 1728864 A | 2/2006 |
| CN | 101668305 A | 3/2010 |

(Continued)

OTHER PUBLICATIONS

International Search Report and the Written Opinion for Application No. PCT/CN2015/087553, dated May 10, 2016, 12 pages.

(Continued)

*Primary Examiner* — Kamran Afshar
*Assistant Examiner* — Minjung Kim
(74) *Attorney, Agent, or Firm* — Nicholson De Vos Webster & Elliott LLP

(57) ABSTRACT

The present disclosure provides a method (300) in a terminal device for camping on sectors. The method (300) comprises: detecting (S310) a broadcast signal from an access node, the broadcast signal being associated with a first sector and having a signal strength higher than a first threshold; adding (S320) the first sector to a set of sectors for the terminal device to camp on; and monitoring (S330) a system message from each sector in the set.

24 Claims, 5 Drawing Sheets

(56) References Cited

U.S. PATENT DOCUMENTS

| | | | |
|---|---|---|---|
| 8,526,906 B1* | 9/2013 | Oroskar | H04W 52/0277 455/343.1 |
| 8,626,203 B1* | 1/2014 | Singh | H04W 68/00 455/426.1 |
| 8,954,097 B1* | 2/2015 | Oroskar | H04W 68/02 370/330 |
| 8,983,461 B1 | 3/2015 | Pandey et al. | |
| 9,042,347 B1* | 5/2015 | Oroskar | H04W 24/00 370/332 |
| 2005/0113087 A1* | 5/2005 | Rick | H04W 68/00 455/434 |
| 2009/0181672 A1* | 7/2009 | Horn | H04W 68/02 455/435.1 |
| 2009/0247156 A1* | 10/2009 | Sampath | H04W 36/0083 455/434 |
| 2010/0067495 A1* | 3/2010 | Lee | H04W 74/008 370/335 |
| 2013/0188628 A1* | 7/2013 | Lee | H04W 48/14 370/338 |
| 2016/0192278 A1* | 6/2016 | Ji | H04W 48/16 370/329 |
| 2016/0308635 A1* | 10/2016 | Zhou | H04W 52/04 |

FOREIGN PATENT DOCUMENTS

| | | |
|---|---|---|
| EP | 2819447 A1 | 12/2014 |
| WO | 9744982 A2 | 11/1997 |
| WO | 2014208844 A1 | 12/2014 |

OTHER PUBLICATIONS

International Preliminary Report on Patentability for Application No. PCT/CN2015/087553, dated Mar. 1, 2018, 6 pages.

Extended European Search Report for Application No. 15901484.4, dated Nov. 26, 2018, 8 pages.

Huawei, et al., "Access Mechanism for Beam Based Approach", 3GPP TSG RAN WG1 Meeting #86, R1-166088, Gothenburg, Sweden, Aug. 22-26, 2016, 8 pages.

* cited by examiner

METHOD FOR CAMPING ON SECTORS AND TERMINAL DEVICE

CROSS-REFERENCE TO RELATED APPLICATIONS

This application is a National stage of International Application No. PCT/CN2015/087553, filed Aug. 19, 2015, which is hereby incorporated by reference.

TECHNICAL FIELD

The present disclosure relates to wireless communication technology, and more particularly, to a method for camping on sectors and a terminal device.

BACKGROUND

Currently, mobile communication technologies are evolving towards higher frequency, larger carrier bandwidth, higher data rate and more heterogeneous layers. The future mobile network, e.g., the $5^{th}$ generation (5G) mobile network, is likely to be a combination of the $3^{rd}$ generation (3G) technologies, the $4^{th}$ generation (4G) technologies and new technologies such as Ultra-Density Network (UDN). In order to meet the increasing demand on higher wireless capacity, the use of frequencies in tens of GHz range has been evaluated. In such evaluations, high frequency bands, for instance, in the frequencies of 10, 30, 60 and 98 GHz are used for the 5G mobile networks. At such frequencies, a very large bandwidth of spectrum is available. Both operating frequency and bandwidth of the 5G networks will be much higher than those used in the current mobile networks e.g., 3G or 4G networks.

However, larger signal attenuation or path loss comes along with higher operating frequency. Typically, a received power of a signal at a receiver can be expressed as:

$$P_{rx} = P_{tx} \cdot G_{tx} \cdot G_{rx} \left(\frac{\lambda}{4\pi r}\right)^2 \cdot e^{-\alpha r} \quad (1)$$

where $P_{tx}$ is the transmitted power of the signal, $G_{tx}$ and $G_{rx}$ are gains of the transmit and receive antennas, respectively, $\lambda$ is the wavelength of the signal, e is a constant value, $\alpha$ is an attenuation factor associated with absorption in the propagation medium, and r is the distance from the transmitter to the receiver. For example, for a millimeter wave link at 60 GHz, the parameter capturing the oxygen absorption loss can be up to 16 dB/km.

It can be seen from Equation (1) that the attenuation of a radio wave is proportional to $1/\lambda^2$. For example, with the same propagation distance, the attenuation of a signal at 60 GHz will be 29.5 dB higher than that of a signal at 2 GHz without considering the oxygen absorption.

In order to compensate for the high attenuation at high frequency, high gain beamforming has been proposed. FIG. 1 shows an example of high gain beamforming. As shown in FIG. 1, an Access Node (AN) 110 has a number (8 in this case) of high gain beams (Beams #0~#7) each covering an area referred to as sector. The AN may broadcast signals to terminal devices 120 and 122 in these sectors by means of beam sweeping.

Furthermore, at higher frequency, the ability for radio waves to penetrate through, or diffract at, blocking objects, such as buildings, vehicles and human bodies, becomes weaker. FIG. 2 shows an exemplary scenario where the terminal device 120 camping on one sector of the AN 110, i.e., the sector associated with Beam #0, loses its camping when it moves into a shadow area behind a wall. In this case, it will take relatively long time for the terminal device 120 to find another sector or AN to camp on, e.g., by blind searching. Such loss of camping may become more frequent due to blocking by human body. For example, the terminal device 122 camping on one sector of the AN 110, i.e., the sector associated with Beam #2, may lose its camping simply because its user blocks Beam #2.

In a mobile communication system, Track Area (TA) information for each registered terminal device is stored at a core network. When there is an incoming session or call for a terminal device, which may be in an idle state, the core network first finds out the TA of the terminal device and then sends a paging message to all ANs in the TA. Each AN that has received the paging message shall broadcast the paging message since the network may not be aware of which AN the terminal device is currently camping on. If high gain beamforming is adopted, the paging message may be broadcasted by means of beam sweeping. If the terminal device does not response to the paging message within a defined time period (e.g., due to loss of its camping AN as a result of blocking by a building or human body), the core network has to expand the TA iteratively and send the paging message in the expanded area. In this case, the paging overhead for the terminal device will be significantly increased.

There is thus a need for an improved camping mechanism for a terminal device.

SUMMARY

It is an object of the present disclosure to provide a method for camping on sectors and a terminal device, capable of mitigating the risk of loss of camping for a terminal device due to blocking by a blocking object.

In a first aspect, a method in a terminal device for camping on sectors is provided. The method comprises: detecting a broadcast signal from an access node, the broadcast signal being associated with a first sector and having a signal strength higher than a first threshold; adding the first sector to a set of sectors for the terminal device to camp on; and monitoring a system message from each sector in the set.

In an embodiment, the first sector is added to the set when a number of sectors included in the set has not reached a maximum allowable number.

In an embodiment, when a number of sectors included in the set has reached a maximum allowable number, and when the signal strength of the broadcast signal associated with the first sector is higher than a signal strength of a broadcast signal associated with a second sector included in the set by at least a predetermined amount, the first sector is added to the set in place of the second sector.

In an embodiment, the method further comprises: removing a sector from the set when a signal strength of its associated broadcast signal has become lower than a second threshold.

In an embodiment, the method further comprises: decoding a system message from one sector in the set; responding to the system message; and stopping monitoring any system message from any sector within the set.

In an embodiment, the method further comprises: decoding at least two system messages from at least two sectors in the set, respectively; and responding to one of the at least two system messages that is selected based on a signal quality of each of the at least two system messages.

In an embodiment, the method further comprises: decoding at least two system messages from at least two sectors in the set, respectively. The at least two sectors belong to different access nodes. The method further comprises: responding to at least one of the at least two system messages that is selected based on a signal quality of each of the at least two system messages.

In an embodiment, the system message is a paging message and said responding to the system message comprises transmitting a random access request in response to the system message.

In an embodiment, the system message is a paging message. The method further comprises: decoding at least two paging messages from at least two sectors in the set, respectively; transmitting a random access request to each of the at least two sectors; receiving a random access response from each of the at least two sectors; and responding to the random access response from one of the at least two sectors that is selected by the terminal device based on a signal quality of each of the random access responses.

In an embodiment, the system message is a paging message. The method further comprises: decoding at least two paging messages from at least two sectors in the set, respectively; transmitting a random access request to each of the at least two sectors; receiving a random access response from one of the at least two sectors that is selected: by an access node when the at least two sectors belong to the access node, or by a coordinator node controlling two or more access nodes when the at least two sectors belong to the two or more access nodes, respectively; and responding to the random access response.

In an embodiment, the broadcast signal is a synchronization signal for sector discovery, or a reference signal for system information broadcast or channel quality measurement.

In an embodiment, the terminal device is in an idle state.

In an embodiment, the set includes more than one sector belonging to one or more access nodes.

In a second aspect, a terminal device is provided. The terminal device comprises: a detecting unit configured to detect a broadcast signal from an access node, the broadcast signal being associated with a first sector and having a signal strength higher than a first threshold; a sector set managing unit configured to add the first sector to a set of sectors for the terminal device to camp on; and a monitoring unit configured to monitor a system message from each sector in the set.

The above embodiments of the first aspect are also applicable for the second aspect.

With the embodiments of the present disclosure, a terminal device can have a set of sectors to camp on. That is, the terminal device can camp on more than one sector simultaneously and monitor system messages from these sectors. In this way, even if the terminal device loses its camping on one of the sectors, it can still receive system messages from other sectors in the set. Accordingly, the time and signaling overhead required for blindly searching another sector or AN to camp on can be saved. Further, this allows the terminal device to respond to the system message timely, such that the signaling overhead associated with the system message can be saved since the system message does not need to be re-transmitted, possibly in an expended area as in the paging scenario.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be noted that the following embodiments are illustrative only, rather than limiting the scope of the disclosure.

Figure 1:
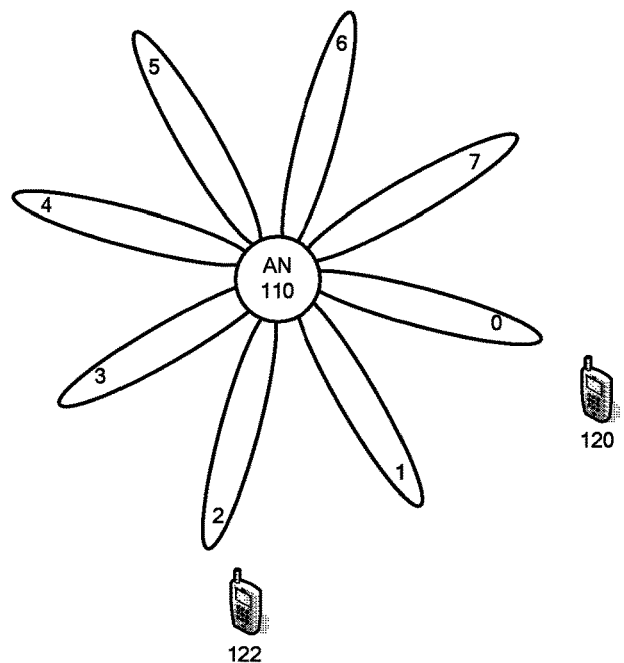
FIG. 1 is a schematic diagram showing an example of high gain beamforming.
Figure 2:
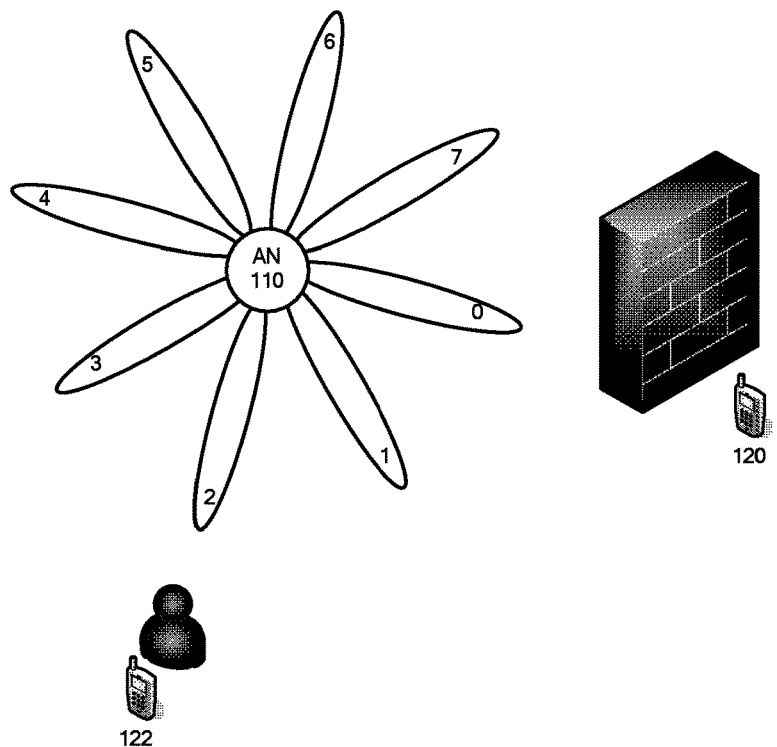
FIG. 2 is a schematic diagram showing an exemplary scenario where a terminal device loses its camping on a sector due to blocking by a wall or a human body.
Figure 3:
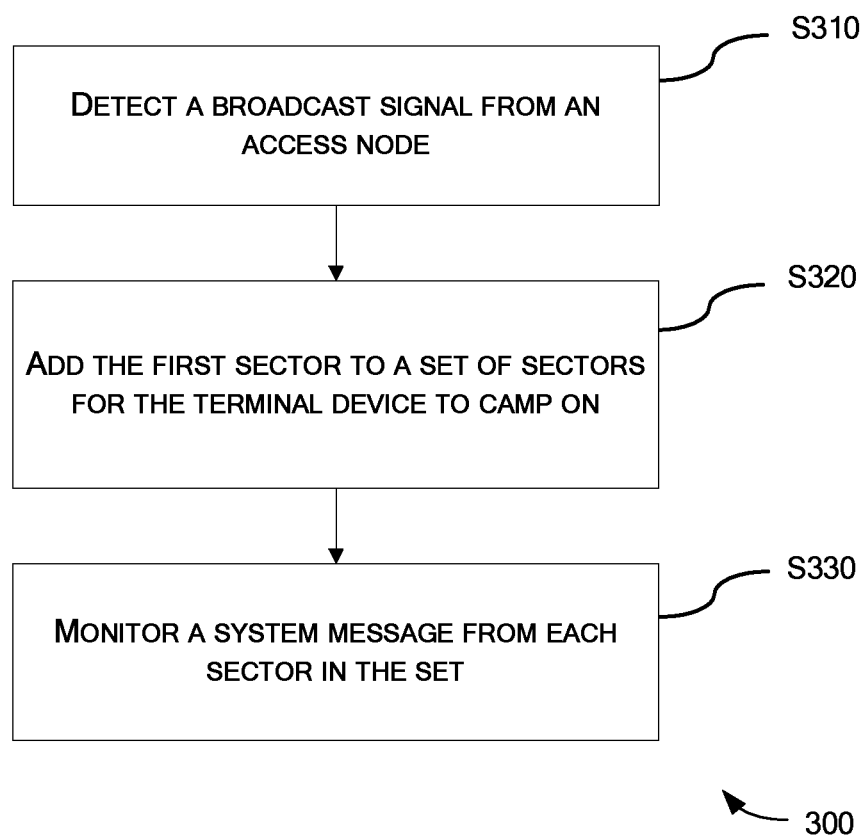
FIG. 3 is a flowchart illustrating a method for camping on sectors according to an embodiment of the present disclosure.

FIG. 3 is a flowchart illustrating a method 300 for camping on sectors according to an embodiment of the present disclosure. The method 300 can be performed at a terminal device (e.g., the terminal device 120 in FIG. 1 or 2). The terminal device can be in an idle state, e.g., Radio Resource Control (RRC)-IDLE state. The method 300 includes the following steps.

At step S310, a broadcast signal from an AN (e.g., the AN 110 in FIG. 1 or 2) is detected. The broadcast signal is associated with a first sector, S1, and has a signal strength higher than a first threshold (i.e., SS1>TH1, where SS1 denotes the signal strength of the broadcast signal associated with the first sector and TH1 denotes the first threshold).

In an example, the broadcast signal can be a synchronization signal for sector discovery, or a reference signal for system information broadcast or channel quality measurement. For example, the broadcast signal can be a Primary Synchronization Signal (PSS) or Secondary Synchronization Signal (SSS) in the 4G network. Such broadcast signal may contain information that enables the terminal device to identify the origin of the signal.

At step S320, the sector S1 is added to a set of sectors for the terminal device to camp on. That is, when the broadcast signal from the sector S1 satisfies SS1>TH1, S1 can be added to the set.

In an example, the number of sectors included in the set cannot exceed a maximum allowable number. In this case, S1 can be added to the set when the number of sectors included in the set has not reached the maximum allowable number.

In another example, when the number of sectors included in the set has reached the maximum allowable number, and when SS1 is higher than a signal strength, SS2, of a broadcast signal associated with a second sector, S2, included in the set by at least a predetermined amount, d, S1 is added to the set in place of S2. That is, even if the number of sectors included in the set has reached the maximum allowable number, when SS1 is sufficiently better than SS2, S1 can replace S2 in the set.

In an example, a sector can be removed from the set when a signal strength of its associated broadcast signal has become lower than a second threshold, TH2. For example, when SS2<TH2, S2 can be removed from the set.

At step S330, a system message from each sector in the set is monitored. That is, by monitoring system messages from the sectors in the set, the terminal device can now camp on these sectors simultaneously.

Figure 4:
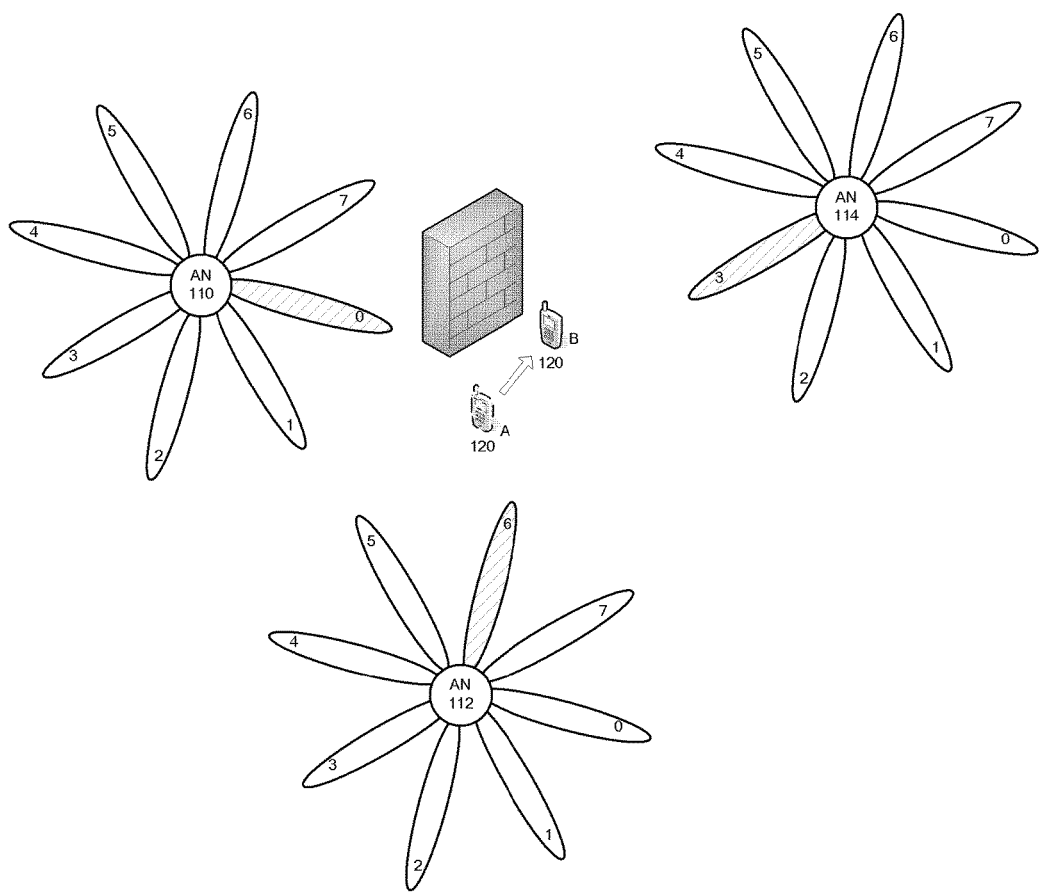
FIG. 4 is a schematic diagram showing an exemplary scenario where a terminal device camps on more than one sector.

FIG. 4 is a schematic diagram showing an exemplary scenario where a terminal device camps on more than one sector. As shown in FIG. 4, when the terminal device 120 is at Location A, it receives a broadcast signal, BS0, associated with Beam #0 of the AN 110, a broadcast signal, BS6, associated with Beam #6 of the AN 112 and a broadcast signal, BS3, associated with Beam #3 of the AN 114. Assuming that the signal strength of each of BS0, BS6 and BS3 is higher than TH1, the terminal device 120 adds the sectors associated with these beams to the set of sectors and camps on these sectors simultaneously. Then, as indicated by the arrow, the terminal device 120 moves from Location A to Location B, where Beam #0 of the AN 110 is blocked by a wall. However, at Location B, the terminal device 120 does not lose its camping since it is still camping on the sectors associated with Beam #6 of the AN 112 and Beam #3 of the AN 114. In this case, the terminal device 120 can still receive system messages from the AN 112 and the AN 114.

Figure 5:
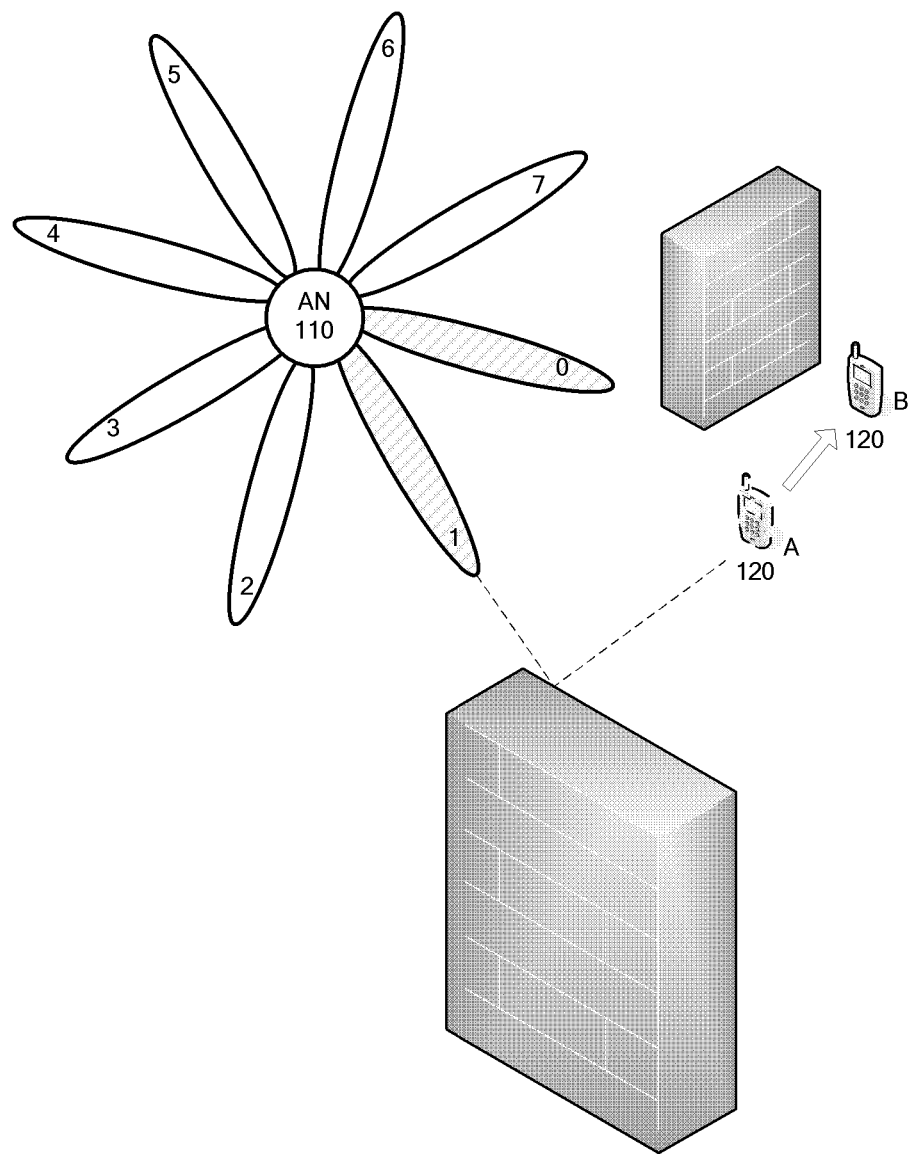
FIG. 5 is a schematic diagram showing another exemplary scenario where a terminal device camps on more than one sector.

FIG. 5 shows another exemplary scenario where a terminal device camps on more than one sector. As shown in FIG. 5, when the terminal device 120 is at Location A, it receives a broadcast signal, BS0, associated with Beam #0 of the AN 110, and a broadcast signal, BS1, associated with Beam #1 of the same AN 110 via reflection. Assuming that the signal strength of each of BS0 and BS1 is higher than TH1, the terminal device 120 adds the sectors associated with these beams to the set of sectors and camps on these sectors simultaneously. Then, as indicated by the arrow, the terminal device 120 moves from Location A to Location B, where Beam #0 is blocked by a wall. However, at Location B, the terminal device 120 does not lose its camping since it is still camping on the sector associated with Beam #1 of the AN 110. In this case, the terminal device 120 can still receive system messages from the AN 110.

It can be seen that the set may include more than one sector belonging to one AN (as shown in FIG. 5) or more than one AN (as shown in FIG. 4). It can be appreciated that the present disclosure is not limited to the scenarios shown in FIG. 4 and FIG. 5. For example, the set may include the sectors associated with Beam #0 and Beam #1 from the AN 110, as well as the sectors associated with Beam #6 of the AN 112 and Beam #3 of the AN 114. In other words, the set may include more than one sector belonging to one or more ANs.

In an example, the terminal device can decode a system message from one sector in the set. In this case, it can respond to the system message and stop monitoring any system message from any sector within the set. For example, the system message is a paging message and the terminal device can transmit a random access request in response to the paging message. That is, once a paging message from any sector in the set has been decoded, the terminal device can start its random access procedure with the sector immediately.

Alternatively, the terminal device can decode at least two system messages from at least two sectors in the set, respectively. In this case, it can respond to one of the at least two system messages that is selected based on a signal quality of each of the at least two system messages. For example, as shown in FIG. 5, the terminal device 120 can decode two paging messages from the sectors associated with Beam #0 and Beam #1 of the AN 110, respectively. Then, if the signal quality of the paging message from the sector associated with Beam #1 is better than that of the paging message from the sector associated with Beam #0, the terminal device 120 can transmit a random access request in response to the paging message having the better signal quality, i.e., the paging message from the sector associated with Beam #1.

Alternatively, the terminal device can decode at least two system messages from at least two sectors in the set, respectively. The at least two sectors belong to different access nodes. In this case, the terminal device can respond to at least one of the at least two system messages that is selected based on a signal quality of each of the at least two system messages. For example, as shown in FIG. 4, the terminal device 120 can decode two paging messages from the sectors associated with Beam #6 of the AN 112 and Beam #3 of the AN 114, respectively. Then, if the signal quality of the paging message from the sector associated with Beam #6 of the AN 112 is better than that of the paging message from the sector associated with Beam #3 of the AN 114, the terminal device 120 can transmit a random access request in response to the paging message having the better signal quality, i.e., the paging message from the sector associated with Beam #6 of the AN 112. As another example, the terminal device may decode three paging messages from three different ANs, respectively, select two of the ANs having the better signal quality and transmit random access requests to the selected two ANs, respectively.

Alternatively, the terminal device may decode at least two paging messages from at least two sectors in the set, respectively, transmit a random access request to each of the at least two sectors, and receive a random access response from each of the at least two sectors. Then, the terminal device can respond to the random access response from one of the at least two sectors that is selected by the terminal device based on a signal quality of each of the random access responses. For example, as shown in FIG. 4, the terminal device 120 can decode two paging messages from the sectors associated with Beam #6 of the AN 112 and Beam #3 of the AN 114, respectively. Then, the terminal device 120 transmits a random access request in response to each of the two paging messages and receives two random access responses from the sectors associated with Beam #6 of the AN 112 and Beam #3 of the AN 114, respectively. Then, if the signal quality of the random access response from the sector associated with Beam #6 of the AN 112 is better than that of the random access response from the sector associated with Beam #3 of the AN 114, the terminal device 120 can proceed the random access procedure with the sector having the better signal quality, i.e., the sector associated with Beam #6 of the AN 112, by responding to the random access response from the sector associated with Beam #6 of the AN 112.

Alternatively, the terminal device may decode at least two paging messages from at least two sectors in the set, respectively, transmit a random access request to each of the at least two sectors, and receive a random access response from one of the at least two sectors. The one sector is selected by an access node when the at least two sectors belong to the access node, or by a coordinator node controlling two or more access nodes when the at least two sectors belong to the two or more access nodes, respectively. Then, the terminal device responds to the random access response. For example, as shown in FIG. 5, the terminal device 120 can decode two paging messages from the sectors associated with Beam #0 and Beam #1 of the AN 110, respectively. Then, the terminal device 120 transmits a random access request to each of the two sectors and receives a random access response from one of the two sectors that is selected by the AN 110, e.g., the sector associated with Beam #1. Here, the AN 110 can select one of the two sectors that has e.g., the better radio quality and/or the lower traffic load. Then, the terminal device 120 proceeds the random access procedure with the sector associated with Beam #1 by responding to the random access response. As another example, as shown in FIG. 4, the terminal device 120 can decode two paging messages from the sectors associated with Beam #6 of the AN 112 and Beam #3 of the AN 114, respectively. Then, the terminal device 120 transmits a random access request to each of the two sectors and receives a random access response from one of the two sectors that is selected by a coordinator node (not shown) controlling the AN 112 and the AN 114, e.g., the sector associated with Beam #6 of the AN 112. Here, the coordinator node can select one of the two sectors that has e.g., the better radio quality and/or the lower traffic load. Then, the terminal device 120 proceeds the random access procedure with the sector associated with Beam #6 of the AN 112 by responding to the random access response. Here, the radio quality may be measured by e.g., strength and/or Signal to Interference and Noise Ratio (SINR) of a reference signal, and the traffic load may be measured by e.g., time-frequency resource utilization ratio, transmission power resource utilization ratio and/or hardware resource utilization ratio.

Figure 6:
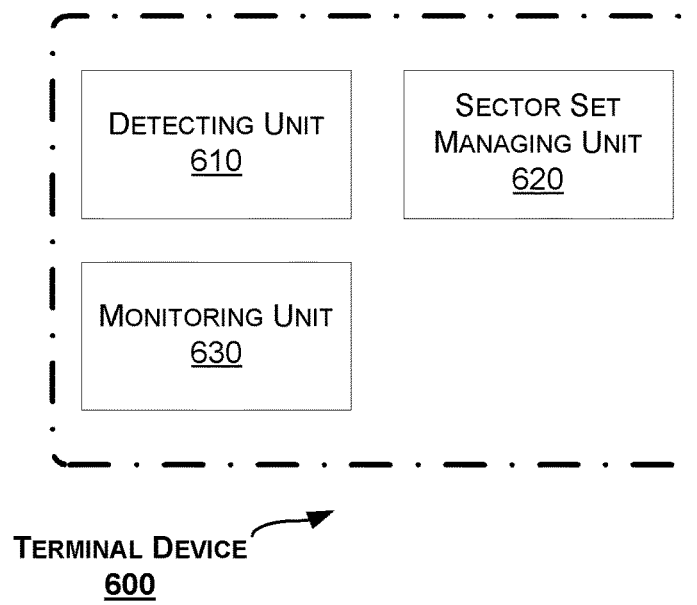
FIG. 6 is a block diagram of a terminal device according to an embodiment of the present disclosure.

Correspondingly to the method 300 as described above, a terminal device is provided. FIG. 6 is a block diagram of a terminal device 600 according to the first scheme of the present disclosure.

As shown in FIG. 6, the terminal device 600 includes a detecting unit 610 configured to detect a broadcast signal from an access node, the broadcast signal being associated with a first sector and having a signal strength higher than a first threshold. The terminal device 600 further includes a sector set managing unit 620 configured to add the first sector to a set of sectors for the terminal device to camp on. The terminal device 600 further includes a monitoring unit 630 configured to monitor a system message from each sector in the set.

In an embodiment, the sector set managing unit 620 is configured to add the first sector to the set when a number of sectors included in the set has not reached a maximum allowable number.

In an embodiment, the sector set managing unit 620 is configured to, when a number of sectors included in the set has reached a maximum allowable number, and when the signal strength of the broadcast signal associated with the first sector is higher than a signal strength of a broadcast signal associated with a second sector included in the set by at least a predetermined amount, add the first sector to the set in place of the second sector.

In an embodiment, the sector set managing unit 620 is further configured to remove a sector from the set when a signal strength of its associated broadcast signal has become lower than a second threshold.

In an embodiment, the terminal device 600 further includes (not shown): a decoding unit configured to decode a system message from one sector in the set; and a responding unit configured to respond to the system message. The monitoring unit 630 is configured to stop monitoring any system message from any sector within the set.

In an embodiment, the terminal device 600 further includes (not shown): a decoding unit configured to decode at least two system messages from at least two sectors in the set, respectively; and a responding unit configured to respond to one of the at least two system messages that is selected based on a signal quality of each of the at least two system messages.

In an embodiment, the terminal device 600 further includes (not shown): a decoding unit configured to decode at least two system messages from at least two sectors in the set, respectively. The at least two sectors belong to different access nodes. The terminal device 600 further includes (not shown): a responding unit configured to respond to at least one of the at least two system messages that is selected based on a signal quality of each of the at least two system messages.

In an embodiment, the system message is a paging message and the responding unit is configured to respond to the system message by transmitting a random access request in response to the system message.

In an embodiment, the system message is a paging message. The terminal device 600 further includes (not shown): a decoding unit configured to decode at least two paging messages from at least two sectors in the set, respectively; a transmitting unit configured to transmit a random access request to each of the at least two sectors; a receiving unit configured to receive a random access response from each of the at least two sectors; and a responding unit configured to respond to the random access response from one of the at least two sectors that is selected by the terminal device based on a signal quality of each of the random access responses.

In an embodiment, the system message is a paging message. The terminal device 600 further includes (not shown): a decoding unit configured to decode at least two paging messages from at least two sectors in the set, respectively; a transmitting unit configured to transmit a random access request to each of the at least two sectors; a receiving unit configured to receive a random access response from one of the at least two sectors that is selected: by an access node when the at least two sectors belong to the access node, or by a coordinator node controlling two or more access nodes when the at least two sectors belong to the two or more access nodes, respectively; and a responding unit configured to respond to the random access response.

In an embodiment, the broadcast signal is a synchronization signal for sector discovery, or a reference signal for system information broadcast or channel quality measurement.

In an embodiment, the terminal device 600 is in an idle state.

In an embodiment, the set includes more than one sector belonging to one or more access nodes.

Each of the units 610-630 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 3.

Figure 7:
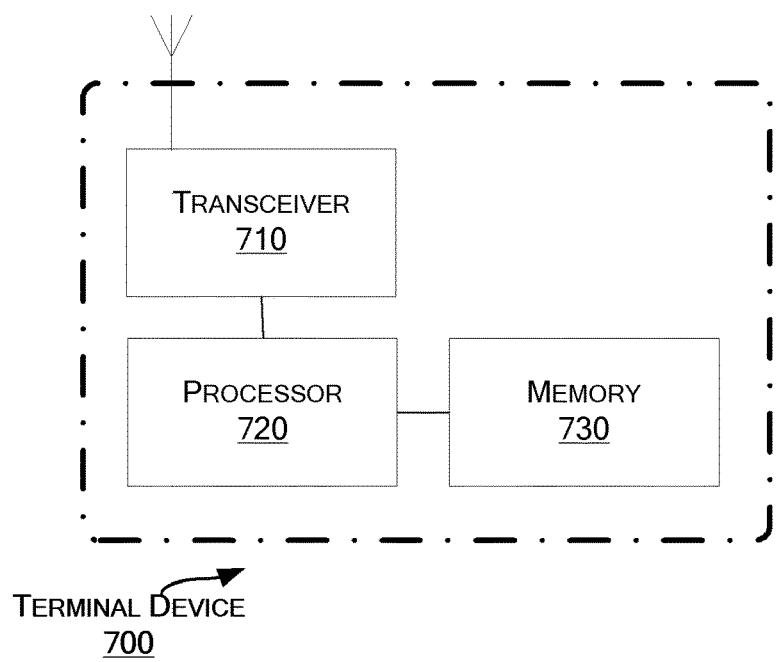
FIG. 7 is a block diagram of a terminal device according to another embodiment of the present disclosure.

FIG. 7 is a block diagram of a terminal device 700 according to another embodiment of the present disclosure.

The terminal device 700 includes a transceiver 710, a processor 720 and a memory 730. The memory 730 contains instructions executable by the processor 720 whereby the terminal device 700 is operative to detect a broadcast signal from an access node, the broadcast signal being associated with a first sector and having a signal strength higher than a first threshold; add the first sector to a set of sectors for the terminal device to camp on; and monitor a system message from each sector in the set.

The present disclosure also provides at least one computer program product in the form of a non-volatile or volatile memory, e.g., an Electrically Erasable Programmable Read-Only Memory (EEPROM), a flash memory and a hard drive. The computer program product includes a computer program. The computer program includes: code/computer readable instructions, which when executed by the processor 720 causes the terminal 700 to perform the actions, e.g., of the procedure described earlier in conjunction with FIG. 3.

The computer program product may be configured as a computer program code structured in computer program modules. The computer program modules could essentially perform the actions of the flow illustrated in FIG. 3.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a terminal device for camping on sectors, comprising:
   detecting a broadcast signal from an access node, the broadcast signal being associated with a first sector and having a signal strength higher than a first threshold;
   adding the first sector to a set of sectors for the terminal device to camp on when the terminal device is in an idle state, wherein, when a number of sectors included in the set has reached a maximum allowable number, and when the signal strength of the broadcast signal associated with the first sector is higher than a signal strength of a broadcast signal associated with a second sector included in the set by at least a predetermined amount, the first sector is added to the set in place of the second sector;
   monitoring for system messages from sectors in the set; and
   starting a random-access procedure of the terminal device with a sector in the set based upon system message reception from at least one sector in the set, wherein the random-access procedure comprises:
      decoding at least two system messages from at least two sectors in the set, respectively;
      transmitting a random-access request to each of the at least two sectors;
      responding to a random-access response from the sector of the at least two sectors, comprising:
         selecting the sector by a coordinator node controlling two or more access nodes when the at least two sectors belong to the two or more access nodes, respectively; and
         transmitting the random-access response by the sector to the terminal device.

2. The method of claim 1, wherein the first sector is added to the set when a number of sectors included in the set has not reached a maximum allowable number.

3. The method of claim 1, further comprising:
   removing one sector from the set when a signal strength of a corresponding broadcast signal has become lower than a second threshold.

4. The method of claim 1, wherein the random-access procedure further comprises:
   decoding a system message from the sector in the set;
   responding to the system message; and
   stopping monitoring any system message from any sector within the set.

5. The method of claim 4, wherein the system message is a paging message and said responding to the system message comprises transmitting a random-access request in response to the system message.

6. The method of claim 1, wherein the random-access procedure further comprises:
   responding to one of the at least two system messages that is selected based on a signal quality of each of the at least two system messages.

7. The method of claim 1, wherein the at least two sectors belong to different access nodes, and wherein the random-access procedure comprises:
   responding to at least one of the at least two system messages that is selected based on a signal quality of each of the at least two system messages.

8. The method of claim 1, wherein a system message is a paging message, and wherein the random-access procedure further comprises:
   receiving a random-access response from each of the at least two sectors; and
   responding to the random-access response from one of the at least two sectors that is selected by the terminal device based on a signal quality of each of the random-access responses.

9. The method of claim 1, wherein a system message is a paging message.

10. The method of claim 1, wherein the broadcast signal is a synchronization signal for sector discovery, or a reference signal for system information broadcast or channel quality measurement.

11. The method of claim 1, wherein the terminal device is in the idle state.

12. The method of claim 1, wherein the set includes more than one sector belonging to one or more access nodes.

13. A terminal device, comprising:
   a processor and non-transitory computer-readable medium storing instructions that when executed by the processor, cause the terminal device to:

detect a broadcast signal from an access node, the broadcast signal being associated with a first sector and having a signal strength higher than a first threshold;

add the first sector to a set of sectors for the terminal device to camp on when the terminal device is in an idle state, wherein, when a number of sectors included in the set has reached a maximum allowable number, and when the signal strength of the broadcast signal associated with the first sector is higher than a signal strength of a broadcast signal associated with a second sector included in the set by at least a predetermined amount, the first sector is added to the set in place of the second sector;

monitor for system messages from sectors in the set, and start a random-access procedure of the terminal device with a sector in the set based upon system message reception from at least one sector in the set, wherein the random-access procedure is to:

decode at least two system messages of at least two sectors in the set, respectively, transmit a random-access request to each of the at least two sectors, respond to a random-access response from the sector from the at least two sectors, wherein the sector is selected by a coordinator node controlling two or more access nodes when the at least two sectors belong to the two or more access nodes, respectively, and the sector transmits the random-access response to the terminal device.

14. The terminal device of claim 13, wherein the terminal device is further to add the first sector to the set when a number of sectors included in the set has not reached a maximum allowable number.

15. The terminal device of claim 13, wherein the terminal device is further to remove one sector from the set when a signal strength of a corresponding broadcast signal has become lower than a second threshold.

16. The terminal device of claim 13, wherein the random-access procedure is further to:

decode a system message from one sector in the set; and respond to the system message, and stop monitoring any system message from any sector within the set.

17. The terminal device of claim 16, wherein the system message is a paging message and terminal device is to respond to the system message by transmitting a random-access request in response to the system message.

18. The terminal device of claim 13, wherein the random-access procedure is further to:

respond to one of the at least two system messages that is selected based on a signal quality of each of the at least two system messages.

19. The terminal device of claim 13, wherein the at least two sectors belong to different access nodes, and wherein the random-access procedure is to:

respond to at least one of the at least two system messages that is selected based on a signal quality of each of the at least two system messages.

20. The terminal device of claim 13, wherein a system message is a paging message, and wherein the random-access procedure is further to:

receive a random-access response from each of the at least two sectors; and respond to the random-access response from one of the at least two sectors that is selected by the terminal device based on a signal quality of each of the random-access responses.

21. The terminal device of claim 13, wherein a system message is a paging message.

22. The terminal device of claim 13, wherein the broadcast signal is a synchronization signal for sector discovery, or a reference signal for system information broadcast or channel quality measurement.

23. The terminal device of claim 13, wherein the terminal device is in the idle state.

24. The terminal device of claim 13, wherein the set includes more than one sector belonging to one or more access nodes.

* * * * *